(No Model.)

W. LEUPOLD.
FODDER BINDER.

No. 385,126. Patented June 26, 1888.

Witnesses,
Thos. H. Hutchins.
Wm. J. Hutchins.

Inventor,
William Leupold.

UNITED STATES PATENT OFFICE.

WILLIAM LEUPOLD, OF CHANNAHON, ILLINOIS.

FODDER-BINDER.

SPECIFICATION forming part of Letters Patent No. 385,126, dated June 26, 1888.

Application filed September 29, 1887. Serial No. 251,002. (No model.)

*To all whom it may concern:*

Be it known that I, WILLIAM LEUPOLD, a citizen of the United States of America, residing at Channahon, in the county of Will and State of Illinois, have invented certain new and useful Improvements in an Implement for Compressing Bundles of Cornstalks, of which the following is a specification, reference being had therein to the accompanying drawings.

This invention relates to certain improvements in fodder-binders, the construction of which and the manner of its operation are fully set forth and explained in the following specification and claim, reference being had to the accompanying drawings, and the letters and figures thereon, which form a part of this specification, in which—

Figure 1:
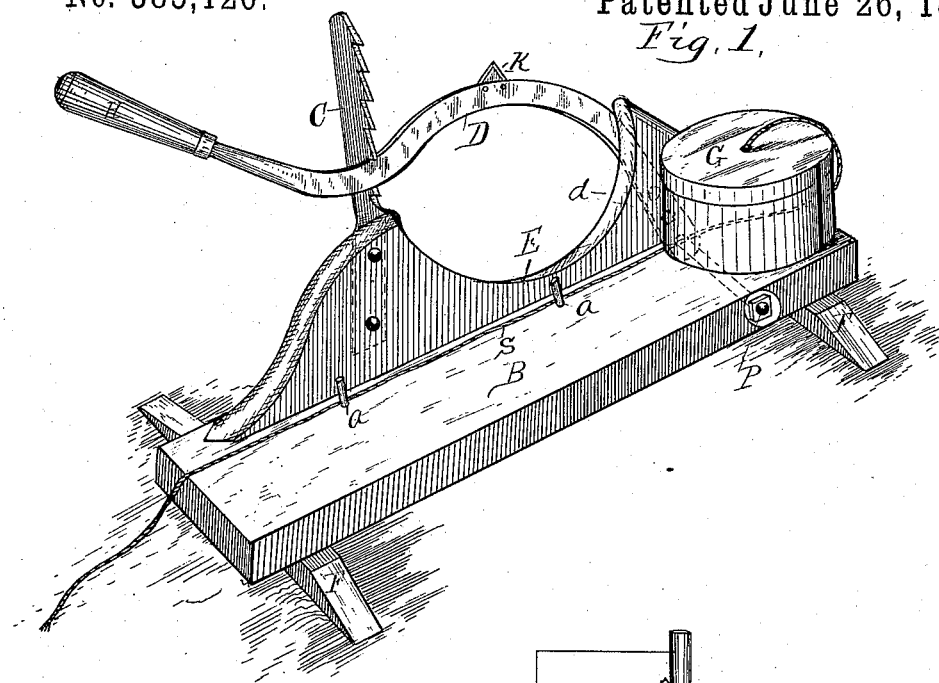
Figure 2:
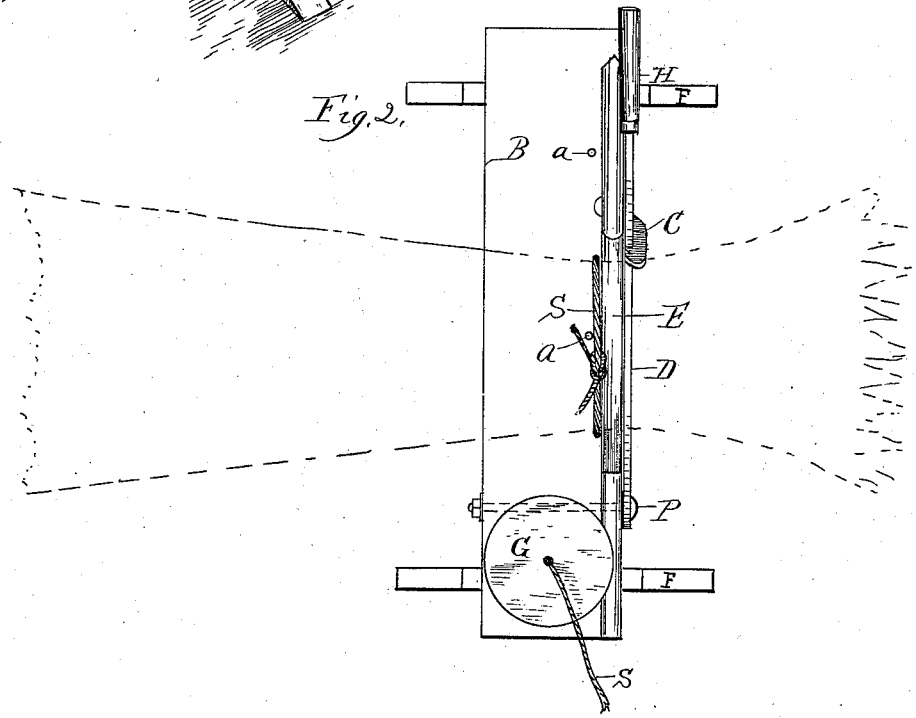

Figure 1 is a perspective view of the implement, and Fig. 2 is a top plan view of the same, also showing by dotted lines a bundle of cornstalks represented as tied.

Referring to the drawings, B represents the base of the device, having a pair of cross-cleats, F F, upon which it rests upon the ground. To the upper part and to one side of the base B is secured a yoke, E, constructed and arranged as shown in Fig. 1.

C represents a ratchet-post, and is secured in a vertical position to the outer part of said yoke at one side from its hollowed part, as also shown in Fig. 1.

D represents a curved lever having a handle, H, and is fulcrumed to one side of base B by means of a bolt, P, passing through a hole in said lever and transversely through said base, as shown.

G represents a twine-box, and is for convenience arranged upon base B at one side from the hollow of yoke E, where it is out of the way of the cornstalks and close to the place where its twine is used.

S represents the twine as it is drawn from the ball within box G, and in Fig. 1 it is shown as being arranged along the side of yoke E upon base B, for the purpose of being under the bundle of stalks when they are laid upon the device in the hollow of yoke E, and *a a* represent a pair of pins arranged vertically in base B a short distance from yoke E, for the purpose of confining the twine S to its proper place. This device is intended to be constructed of some light-weight material, in order that it may be conveniently carried from place to place about a field by the operator.

In operation the device is carried to the field and placed upon the ground where it will be convenient to lay the cornstalks upon it. The lever D is thrown back so as to expose the hollow of yoke E, and the twine having been arranged as shown in Fig. 1, the operator then cuts and lays the cornstalks upon the device in the hollow of yoke E, resting that portion of the bundle where it is desired to secure the band in the yoke. When sufficient stalks have been cut for a bundle, the operator grasps the handle H of the lever and brings the lever over upon the stalks and applies his weight to the lever to compress the bundle, because of their being confined between said lever and yoke, and when sufficiently compressed the lever D is hooked under one of the ratchet-teeth of post C, where it is held until the twine S is brought up about the bundle and tied, as shown in Fig. 2, after which the lever is loosened and thrown back, the bundle removed, more twine pulled out and arranged as described, and the device is in order to receive the next succeeding bundle.

The fulcrumed end of lever D has a series of holes, (shown by dotted lines at *d* in Fig. 1,) and the lever may be fulcrumed at either hole, which will, in connection with the ratchet-post *c*, adapt the device to bind different-sized bundles.

K is a knife secured to the upper part of lever D on the back of its curve, as shown in Fig. 1, and is for the purpose of cutting off the twine after the bundle has been bound by drawing the twine across said knife.

Having thus described my invention, what I claim as new, and desire to secure by Letters Patent, is as follows, to wit:

The combination of the base B, having the cross foot-cleats F and pins *a* on its upper face, twine-receptacle G, secured on the upper face of said base at one end, yoke E, secured longitudinally on the upper face of said base along one side thereof, so as to leave a space between it and said pins, curved arm D, pivotally secured to the outer side of said base, near one end thereof, and arranged to have its curve opposite the curved part of said yoke and operate in conjunction therewith, and ratchet-post C, secured to the outer side of said yoke, near the outer end of said curved arm, for engaging therewith, substantially as and for the purpose set forth.

WILLIAM LEUPOLD.

Witnesses:
  THOS. H. HUTCHINS,
  WM. J. HUTCHINS.